United States Patent [19]

Pachonik

[11] Patent Number: 4,502,095
[45] Date of Patent: Feb. 26, 1985

[54] REGENERABLE ELECTRIC LAYER CAPACITOR

[75] Inventor: Horst Pachonik, Taufkirchen, Fed. Rep. of Germany

[73] Assignee: Siemens Aktiengesellschaft, Berlin and Munich, Fed. Rep. of Germany

[21] Appl. No.: 524,892

[22] Filed: Aug. 19, 1983

[30] Foreign Application Priority Data

Aug. 25, 1982 [DE] Fed. Rep. of Germany ....... 3231576

[51] Int. Cl.³ .............................................. H01G 1/017
[52] U.S. Cl. ...................................... 361/273; 361/305
[58] Field of Search ......................... 361/273, 304, 305

[56] References Cited

U.S. PATENT DOCUMENTS

| 3,326,718 | 6/1967 | Dill ................................. 361/304 X |
| 4,190,878 | 2/1980 | Fürster ................................. 361/305 |
| 4,215,385 | 7/1980 | Behn et al. ....................... 361/305 X |

FOREIGN PATENT DOCUMENTS

| 210 | 1/1979 | European Pat. Off. ............ 361/273 |
| 2703636 | 1/1980 | Fed. Rep. of Germany . |
| 2843581 | 4/1980 | Fed. Rep. of Germany . |
| 803132 | 10/1958 | United Kingdom ................ 361/273 |

Primary Examiner—Donald A. Griffin
Attorney, Agent, or Firm—Herbert L. Lerner; Laurence A. Greenberg

[57] ABSTRACT

A regenerable electric layer capacitor includes a carrier being formed of insulating material and having two sides, aluminum layers of different polarity and dielectric layers produced by glow polymerization alternatingly disposed on the carrier, the aluminum layers of each polarity being extended beyond the dielectric layers toward a different respective side of the carrier, and the aluminum layers containing substantially 1.5 to 10% by weight of copper for prevention of thermomigration.

4 Claims, 1 Drawing Figure

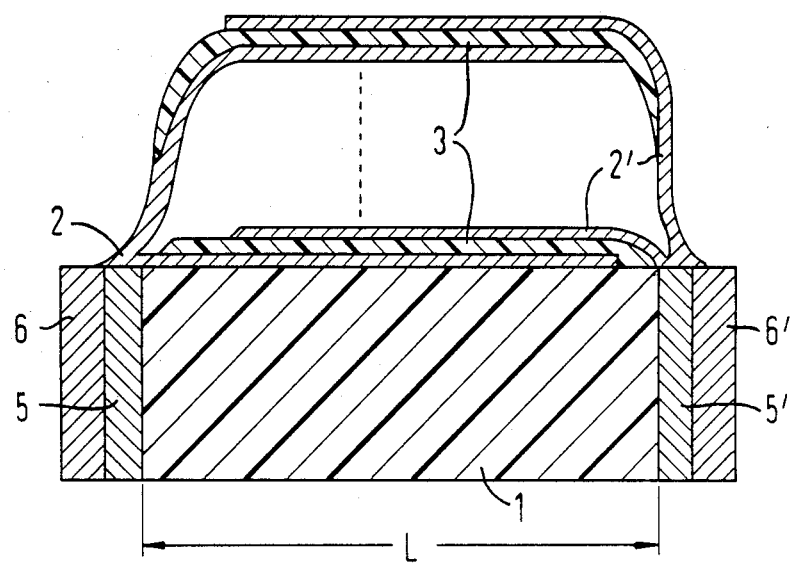

REGENERABLE ELECTRIC LAYER CAPACITOR

The invention relates to a regenerable electric layer capacitor, wherein metal layers of aluminum and dielectric layers produced through glow polymerization are alternatingly disposed one above the other on an insulating material carrier, whereby the metal layers of one polarity project on one side and the metal layers of the other polarity project on the other side beyond the dielectric layers.

Such a capacitor is known from German Published, Non-Prosecuted application DE-A No. 28 43 581. In the prior art device the metal layers formed of aluminum are vapor-deposited in a vacuum or produced by means of cathode sputtering and have, for example, a thickness of 30 nm.

In the case of a capacitor, which contains, for example, 100 glow polymeride and aluminum layers, respectively, the layers are connected with each other by cohesive or material bonding (stoffschlüssig). The required boundaries of the alternatingly disposed layers are generated by superimposed masks.

To reach a maximum capacitance in the capacitor, it is necessary to make the dielectric layers very thin so that their thickness is preferably 0.1 to 0.5 μm. In order to ensure that these thin layers are regenerable, aluminum is used as a cover metal, which forms an insulating oxide as a so-called valve metal.

When storing such capacitors at increased temperature (>70° C.), impermissible losses in the electric resistance of the capacitor occur, which affect its function. This effect generally occurs after a few hours, or at the latest after a few days.

The period during which this insulation loss occurs is shortened by increasing temperature, and in addition the insulation loss shows a certain dependence upon the composition of the electric layers. The loss is attributed to a travelling of the aluminum atoms, which is a thermomigration led back into the dielectric layers.

It is accordingly an object of the invention to provide a regenerable electric layer capacitor, which overcomes the hereinaforementioned disadvantages of the heretofore-known devices of this general type, and in which an insulation loss through thermomigration does not occur.

With the foregoing and other objects in view there is provided, in accordance with the invention, a regenerable electric layer capacitor, comprising a carrier being formed of insulating material and having two sides, aluminum layers of different polarity and dielectric layers produced by glow polymerization alternatingly disposed on the carrier, the aluminum layers of each polarity being extended beyond the dielectric layers toward a different respective side of the carrier, and the aluminum layers containing substantially 1.5 to 10% by weight of copper for prevention of thermomigration. In other words, there is provided at least one sandwich formed of a pair of aluminum layers of different polarity disposed on the carrier and a dielectric layer produced by glow polymerization disposed between the aluminum layers, in each of the sandwiches, the aluminum layers of each polarity being extended beyond the dielectric layer toward a different respective side of the carrier, and the aluminum layers containing substantially 1.5 to 10% by weight of copper for prevention of thermomigration.

According to a concomitant feature of the invention the aluminum layers contain substantially 2.5 to 4% by weight of copper.

The capacitors according to the invention have the advantage of ensuring that a temperature and time dependent insulation loss no longer occurs, even after a few thousand hours storage at elevated temperature.

With a copper portion of less than 1.5% by weight, the thermomigration is only incompletely forestalled, while above 10% by weight copper, the metal layers are embrittled.

Regenerable electric capacitors are known already from the state of the art according to German Published, Prosecuted application DE-B No. 27 03 636, corresponding to U.S. Pat. No. 4,215,385. In that device, the metal layers contain an alloy of aluminum with copper. However, it concerns capacitors which are formed of wound metallized plastic foils. Because of thermomigration, an insulation loss is not observed in such capacitors, and the metal layers provided therein formed of an alloy of aluminum and copper, have the function of forestalling a capacity reduction of the capacitor by operation in a steam and/or oxygen-containing atmosphere.

Other features which are considered as characteristic for the invention are set forth in the appended claims.

Although the invention is illustrated and described herein as embodied in a regenerable electric layer capacitor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing, which is a diagrammatic cross-sectional view of an embodiment example of a capacitor according to the invention.

Referring now to the FIGURE of the drawing in detail, it is seen that metal layers 2 and 2' and glow polymer dielectric layers 3 are alternatingly disposed on insulating carrier material 1 having a width L. The metal layers 2 which are of one polarity are connected to contact layers 5 and 6 which are disposed on one end face of the carrier material 1, and the metal layers 2' which are of the other polarity are connected to contact layers 5' and 6' which are disposed on the other end face of the carrier material 1. The contact layers 5, 6 and 5', 6', respectively, serve as connections to outer non-illustrated terminal elements.

The metal layers are formed of aluminum and contain substantially 1.5 to 10% by weight of copper, for preventing thermomigration. Preferably, the aluminum layers contain substantially 2.5 to 4% by weight of copper.

The foregoing is a description corresponding in substance to German application No. P 32 31 576.7, dated Aug. 25, 1982, the International priority of which is being claimed for the instant application, and which is hereby made part of this application. Any material discrepancies between the foregoing specification and the aforementioned corresponding German application are to be resolved in favor of the latter.

I claim:

1. Regenerable electric layer capacitor, comprising a carrier being formed of insulating material and having two sides, aluminum layers of different polarity and dielectric layers produced by glow polymerization alternatingly disposed on said carrier, said aluminum layers of each polarity being extended beyond said dielectric layers toward a different respective side of said carrier, and said aluminum layers containing substantially 1.5 to 10% by weight of copper for prevention of thermomigration.

2. Regenerable electric layer capacitor according to claim 1, wherein said aluminum layers contain substantially 2.5 to 4% by weight of copper.

3. Regenerable electric layer capacitor, comprising a carrier being formed of insulating material and having two sides, at least one sandwich formed of a pair of aluminum layers of different polarity disposed on said carrier and a dielectric layer produced by glow polymerization disposed between said aluminum layers, in each of said sandwiches, said aluminum layers of each polarity being extended beyond said dielectric layer toward a different respective side of said carrier, and said aluminum layers containing substantially 1.5 to 10% by weight of copper for prevention of thermomigration.

4. Regenerable electric layer capacitor according to claim 3, wherein said aluminum layers contain substantially 2.5 to 4% by weight of copper.

* * * * *